US012566366B2

(12) United States Patent　(10) Patent No.:　US 12,566,366 B2
Akiyama　(45) Date of Patent:　Mar. 3, 2026

(54) WAVELENGTH CONVERTER, LIGHT SOURCE APPARATUS, AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 403 days.

(21) Appl. No.: 18/189,254

(22) Filed: Mar. 24, 2023

(65) Prior Publication Data

US 2023/0305373 A1　Sep. 28, 2023

(30) Foreign Application Priority Data

Mar. 24, 2022　(JP) ................................. 2022-047983

(51) Int. Cl.
G03B 21/20　(2006.01)
(52) U.S. Cl.
CPC ....... G03B 21/204 (2013.01); G03B 21/2066 (2013.01)
(58) Field of Classification Search
CPC ..................................................... G03B 21/20
See application file for complete search history.

(56) References Cited

U.S. PATENT DOCUMENTS

| | | | |
|---|---|---|---|
| 2008/0123343 A1 | 5/2008 | Kobayashi et al. | |
| 2011/0310363 A1 | 12/2011 | Kita | |
| 2018/0017856 A1 | 1/2018 | Tanaka et al. | |
| 2019/0097095 A1 * | 3/2019 | Yamanaka | .......... H01S 5/02326 |

FOREIGN PATENT DOCUMENTS

| | | | |
|---|---|---|---|
| JP | 2008-026853 A | 2/2008 | |
| JP | 2012-004009 A | 1/2012 | |
| JP | 2012209036 A * | 10/2012 | .......... G03B 21/204 |
| JP | 2013-250494 A | 12/2013 | |
| JP | 2018-013764 A | 1/2018 | |
| WO | WO-2019203078 A1 * | 10/2019 | .............. H01S 5/02 |

* cited by examiner

*Primary Examiner* — Bao-Luan Q Le
*Assistant Examiner* — Danell L Owens
(74) *Attorney, Agent, or Firm* — Dority & Manning, P.A.

(57)　ABSTRACT

A wavelength converter includes a substrate having a support surface, a first optical member including a first optical layer that transmits first light, a first wavelength conversion layer that is disposed at the support surface and converts the first light into second light, a second wavelength conversion layer that is disposed at a first wavelength conversion layer side with respect to the first optical layer and converts the first light into third light, a light emitting part that is formed by at least the substrate and the first optical member and emits light, and a second optical member that includes a second optical layer that reflects the first light and transmits the second and third lights and is disposed in the light emitting part. The first optical layer reflects the second and third lights. The second wavelength conversion layer converts part of the first light into the third light.

20 Claims, 6 Drawing Sheets

WAVELENGTH CONVERTER, LIGHT SOURCE APPARATUS, AND PROJECTOR

The present application is based on, and claims priority from JP Application Serial Number 2022-047983, filed Mar. 24, 2022, the disclosure of which is hereby incorporated by reference herein in its entirety.

BACKGROUND

1. Technical Field

The present disclosure relates to a wavelength converter, a light source apparatus, and a projector.

2. Related Art

There has been a proposed light source apparatus that generates illumination light by using fluorescence emitted from a phosphor when the phosphor is irradiated with excitation light outputted from a light source. For example, JP-A-2018-013764 discloses a light source apparatus using a reflective phosphor wheel that emits fluorescence via the surface on which excitation light is incident.

The light source apparatus described above, however, has room for improvement in terms of efficient extraction of the fluorescence as the illuminator light. The light source apparatus described above therefore has a problem of a decrease in the fluorescence extraction efficiency.

SUMMARY

To solve the problem described above, a wavelength converter according to an aspect of the present disclosure includes a substrate having a support surface, a first optical member including a first optical layer that faces the support surface and transmits first light having a first wavelength band and incident from a side opposite from the substrate, a first wavelength conversion layer disposed at the support surface and including a light incident surface on which the first light emitted from the first optical layer is incident, the first wavelength conversion layer being configured to convert the first light into second light having a second wavelength band different from the first wavelength band, a second wavelength conversion layer disposed at a first wavelength conversion layer side with respect to the first optical layer and configured to convert the first light into third light having a third wavelength band different from the first wavelength band, a light emitting part formed by at least the substrate and the first optical member and configured to emit light, and a second optical member disposed at the light emitting part and including a second optical layer that reflects the first light and transmits the second and third lights. The first optical layer inclines with respect to the light incident surface and reflects the second and third lights. The second wavelength conversion layer converts part of the first light emitted from the first wavelength conversion layer into the third light.

A light source apparatus according to another aspect of the present disclosure includes a light source that outputs the first light, and the wavelength converter according to the aspect of the present disclosure.

A projector according to another aspect of the present disclosure includes the light source apparatus according to the other aspect of the present disclosure, a light modulator that modulates light emitted from the light source apparatus, and a projection optical apparatus that projects the light modulated by the light modulator.

BRIEF DESCRIPTION OF THE DRAWINGS

FIG. 1 shows a schematic configuration of a projector according to a first embodiment.

FIG. 3 is a perspective view showing the configurations of key parts of a wavelength converter.

DESCRIPTION OF EXEMPLARY EMBODIMENTS

Figure 2:
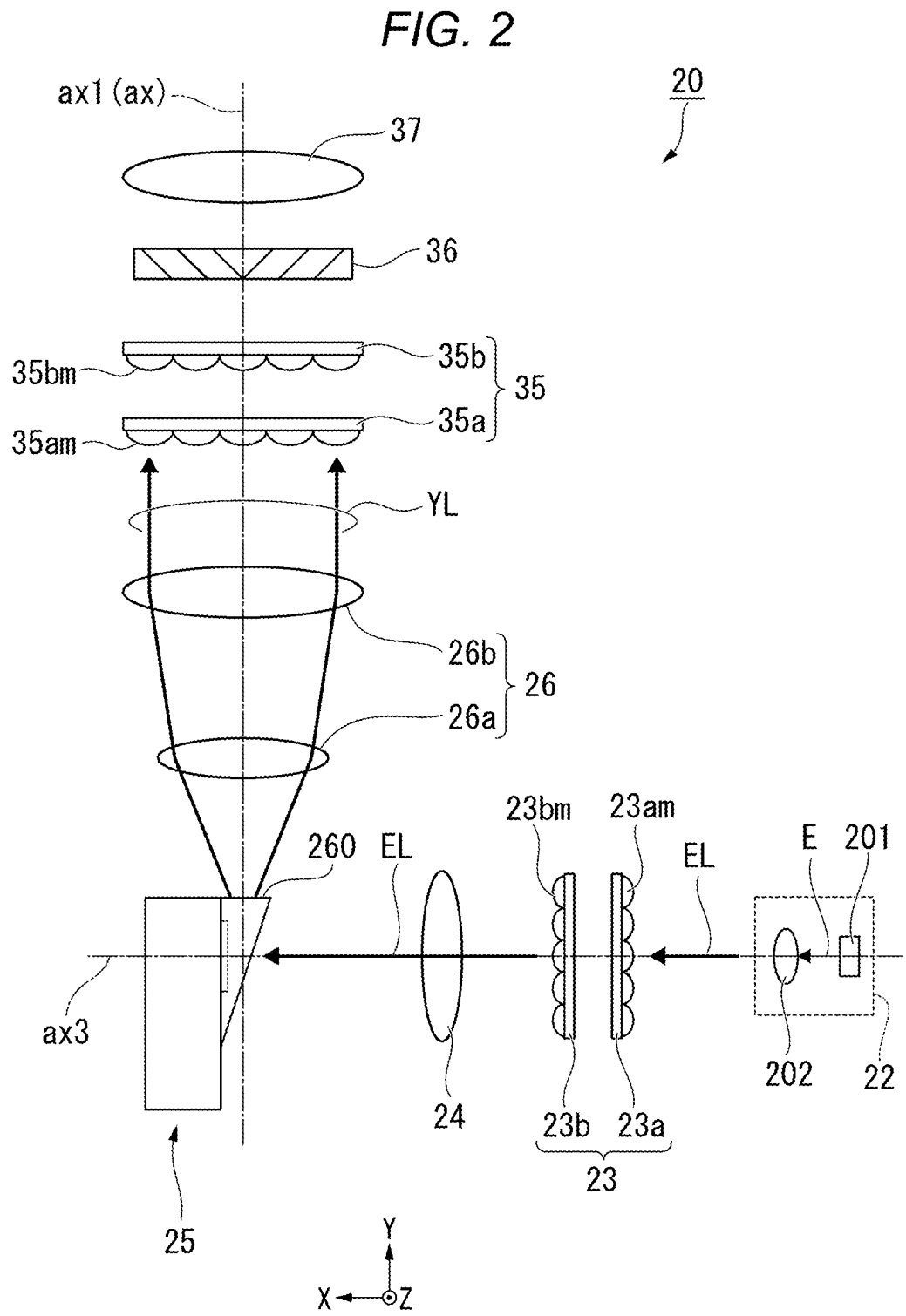
FIG. 2 is a schematic configuration diagram of a light source device.

Embodiments of the present disclosure will be described below in detail with reference to the drawings.

In the drawings used in the description below, a characteristic portion is enlarged for convenience in some cases for clarity of the characteristic thereof, and the dimension ratio and other factors of each component are therefore not always equal to actual values.

First Embodiment

An example of a projector according to the present embodiment will be described.

Figure 1:
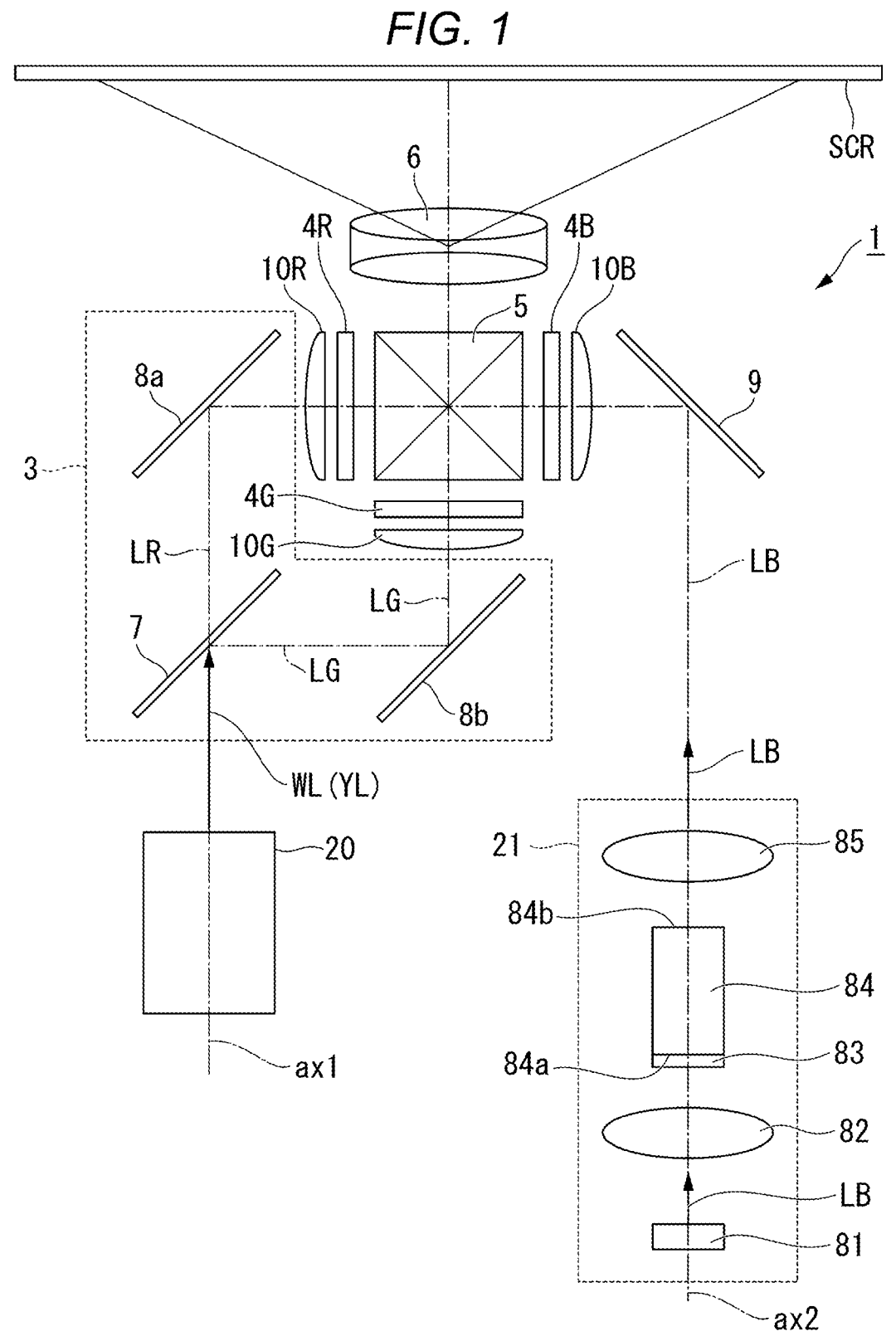

FIG. 1 shows a schematic configuration of a projector 1 according to the present embodiment.

A projector 1 according to the present embodiment is a projection-type image display apparatus that displays color video images on a screen SCR, as shown in FIG. 1. The projector 1 includes a color separation system 3, light modulators 4R, 4G, and 4B, a light combining system 5, a projection optical apparatus 6, a first light source apparatus (light source apparatus) 20, and a second light source apparatus 21. The first light source apparatus 20 corresponds to an embodiment of the light source apparatus according to the present disclosure.

The color separation system 3 separates yellow illumination light WL from the first light source apparatus 20 into red light LR and green light LG. The color separation system 3 includes a dichroic mirror 7, a first reflection mirror 8a, and a second reflection mirror 8b.

The dichroic mirror 7 separates the illumination light WL into the red light LR and the green light LG. The dichroic mirror 7 transmits the red light LR and reflects the green light LG out of the illumination light WL. The second reflection mirror 8b reflects the green light LG toward the light modulator 4G. The first reflection mirror 8a is disposed in the optical path of the red light LR and reflects the red light LR having passed through the dichroic mirror 7 toward the light modulator 4R.

On the other hand, blue light LB from the second light source apparatus 21 is reflected off a reflection mirror 9 toward the light modulator 4B.

The configuration of the second light source apparatus 21 will now be described.

The second light source apparatus 21 includes a light source 81, a focusing lens 82, a diffuser plate 83, a rod lens 84, and a relay lens 85. The light source 81 is formed of at least one semiconductor laser and outputs the blue light LB formed of laser light. The light source 81 is not limited to a semiconductor laser and may instead be an LED that emits blue light.

The focusing lens 82 is formed of a convex lens and causes the blue light LB to be incident on the diffuser plate 83 with the blue light LB substantially focused thereon. The diffuser plate 83 diffuses the blue light LB from the light source 81 by a predetermined degree of diffusion to generate blue light LB having a uniform light orientation distribution close to that of the illumination light WL outputted from the first light source apparatus 20. The diffuser plate 83 can, for example, be a ground glass plate made of optical glass.

The blue light LB diffused by the diffuser plate 83 enters the rod lens 84. The rod lens 84 has a quadrangular columnar shape extending along an illumination optical axis ax2 of the second light source apparatus 21 and has a light incident end surface 84*a* provided at one end and a light exiting end surface 84*b* provided at the other end. The diffuser plate 83 is fixed to the light incident end surface 84*a* of the rod lens 84 via an optical adhesive that is not shown. It is desirable that the refractive index of the diffuser plate 83 match as much as possible with the refractive index of the rod lens 84.

The blue light LB propagates through the rod lens 84 while being totally reflected therein and exits via the light exiting end surface 84*b* with the illuminance distribution uniformity of the blue light LB improved. The blue light LB having exited out of the rod lens 84 enters the relay lens 85. The relay lens 85 causes the blue light LB having the illuminance distribution uniformity improved by the rod lens 84 to be incident on the reflection mirror 9.

The light exiting end surface 84*b* of the rod lens 84 has a rectangular shape substantially similar to the shape of an image formation region of the light modulator 4B. The blue light LB having exited out of the rod lens 84 is thus efficiently incident on the image formation region of the light modulator 4B.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers that are not shown are disposed on the light incident side and the light exiting side of each of the liquid crystal panels and configured to transmit only linearly polarized light polarized in a specific direction.

Field lenses 10R, 10G, and 10B are disposed on the light incident side of the light modulators 4R, 4G, and 4B, respectively. The field lenses 10R, 10G, and 10B parallelize each of the light fluxes of the red light LR, the green light LG, and the blue light LB to be incident on the respective light modulators 4R, 4G, and 4B.

The light combining system 5 receives the image light outputted from the light modulators 4R, 4G, and 4B, combines the image light corresponding to the red light LR, the image light corresponding to the green light LG, and the image light corresponding to the blue light LB with one another, and outputs the combined image light toward the projection optical apparatus 6. The light combining system 5 is, for example, a cross dichroic prism.

The projection optical apparatus 6 is formed of a plurality of lenses. The projection optical apparatus 6 enlarges the combined image light from the light combining system 5 and projects the enlarged image light toward the screen SCR. An image is thus displayed on the screen SCR.

First Light Source Apparatus

FIG. 2 is a schematic configuration diagram of the first light source apparatus 20.

In the following drawings including FIG. 2, each component of the first light source apparatus 20 will be described by using an XYZ coordinate system as required. The axis X is an axis parallel to an optical axis ax3 of the light source 22, the axis Y is an axis perpendicular to the optical axis ax3 of the light source 22 and parallel to an illumination optical axis ax1 of the first light source apparatus 20, and the axis Z is an axis perpendicular to the axes X and Y. That is, the optical axis ax3 and the illumination optical axis ax1 are present in the same plane, and the optical axis ax3 is perpendicular to the illumination optical axis ax1.

The first light source apparatus 20 includes the light source 22, a homogenizer system 23, a focusing system 24, a wavelength converter 25, a pickup system 26, an optical integration system 35, a polarization converter 36, and a superimposing lens 37, as shown in FIG. 2.

The light source 22 includes a light emitter 201 and a collimation lens 202. The light emitter 201 is formed of a plurality of semiconductor lasers. The light emitter 201 outputs a plurality of light beams E. Each of the light beams E is formed of light having a blue wavelength band (first wavelength band) ranging from 400 nm to 480 nm and is, for example, a light beam having a peak wavelength of 455 nm.

The collimation lens 202 is disposed in correspondence with the light emitter 201. The collimation lens 202 converts the light beams E outputted from the light emitter 201 into parallelized light. The number of light emitters 201 and collimation lenses 202 is not limited to a specific number.

The light source 22 thus outputs excitation light (first light) EL formed of the parallelized luminous flux and having the blue wavelength band (first wavelength band). In the present embodiment, the light source 22 outputs linearly polarized blue light as the excitation light EL.

In the first light source apparatus 20 according to the present embodiment, the light source 22, the homogenizer system 23, the focusing system 24, and the wavelength converter 25 are disposed on the optical axis ax3 of the light source 22.

The excitation light EL outputted from the light source 22 enters the homogenizer system 23. The homogenizer system 23 is formed, for example, of a lens array 23*a* and a lens array 23*b*. The lens array 23*a* includes a plurality of lenslets 23*am*, and the lens array 23*b* includes a plurality of lenslets 23*bm*.

The lens array 23*a* separates the excitation light EL into a bundle of a plurality of thin beams. The lenslets 23*am* of the lens array 23*a* bring the bundle of thin beams into focus at the corresponding lenslets 23*bm* of the lens array 23*b*. The lens array 23*b*, along with the focusing system 24, which will be described later, superimposes images of the lenslets 23*am* of the lens array 23*a* on a first phosphor layer 251 of the wavelength converter 25. The focusing system 24 cooperates with the homogenizer system 23 to homogenize the illuminance distribution of the excitation light EL to be incident on the first phosphor layer 251 of the wavelength converter 25. The focusing system 24 is formed of a single lens or a plurality of lenses.

The wavelength converter 25 generates fluorescence YL when excited by the excitation light EL incident from the light source 22 toward the side +X, and outputs the generated fluorescence YL via a light emitting part 260.

Figure 3:
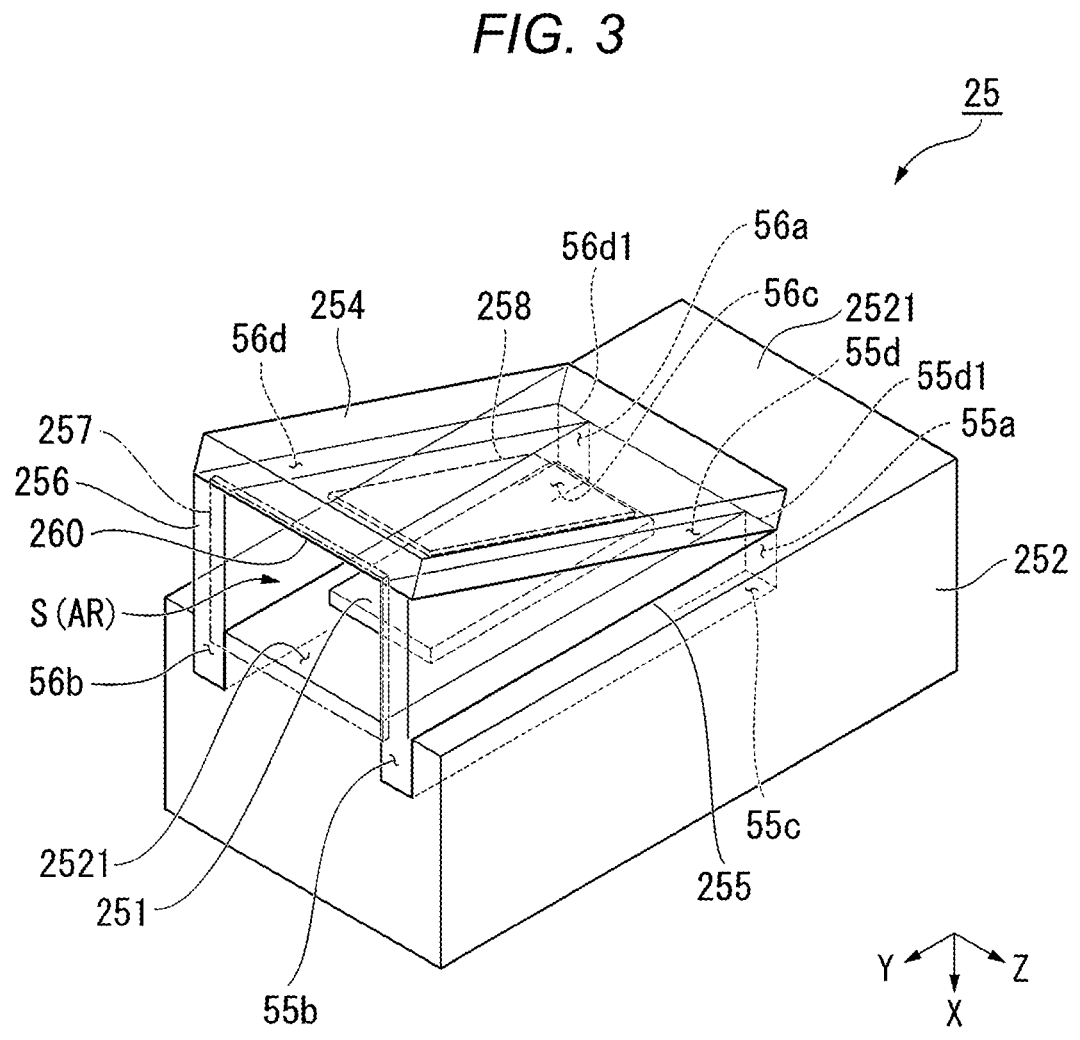
Figure 4:
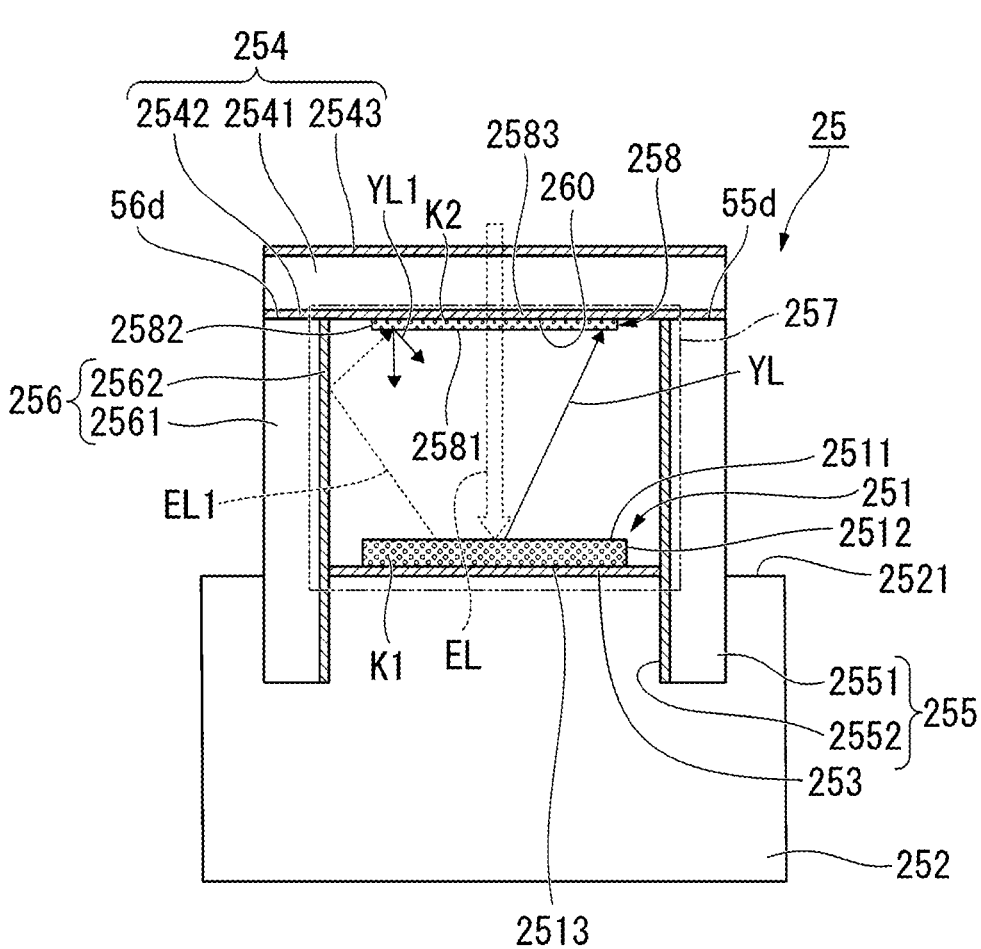
FIG. 4 is a front view of the wavelength converter.
Figure 4:
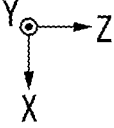
Figure 5:
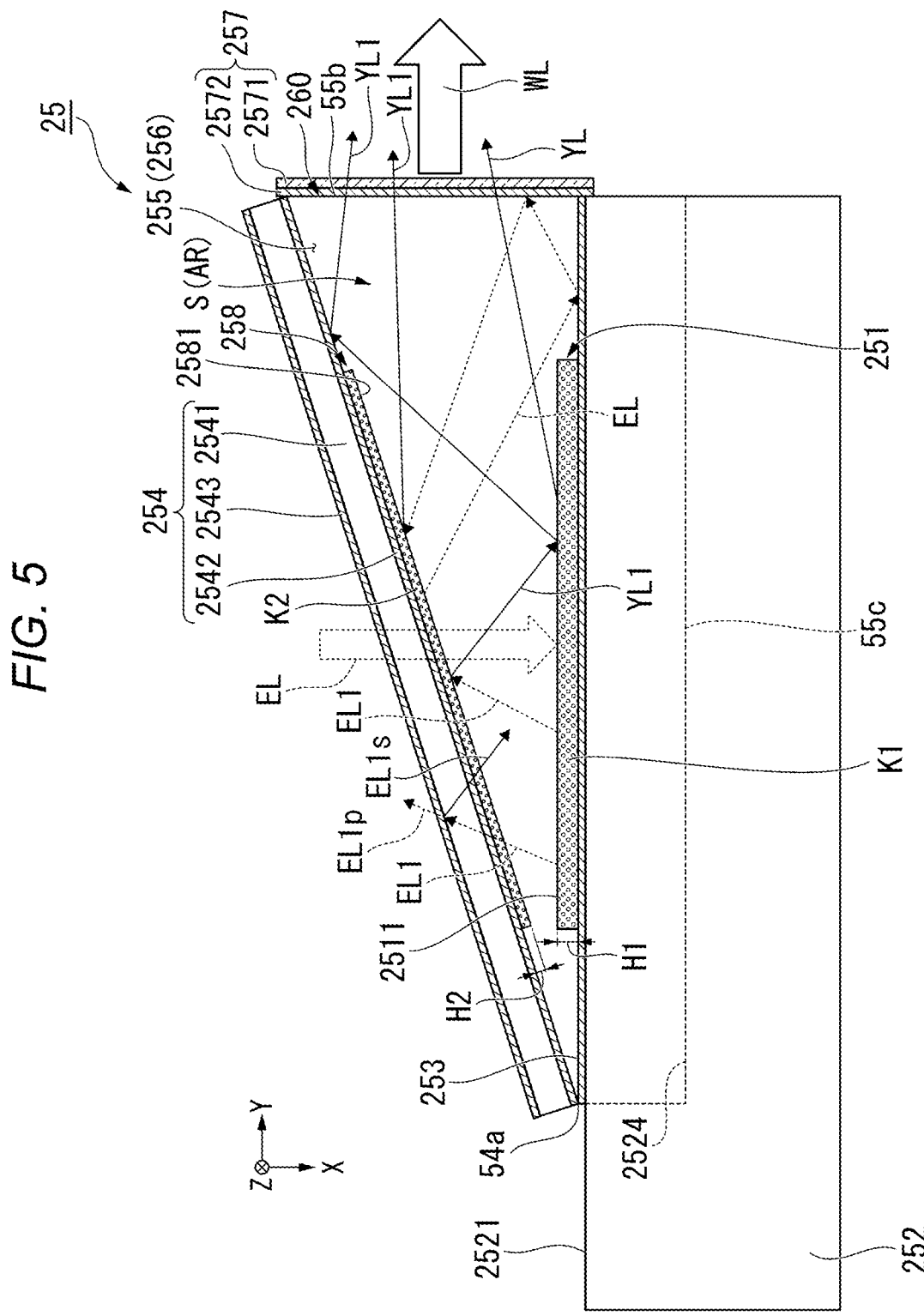
FIG. 5 is a cross-sectional view of the wavelength converter.

The configuration of the wavelength converter 25 will be subsequently described in detail. FIG. 3 is a perspective view showing the configurations of key parts of the wavelength converter 25. FIG. 4 is a front view of the wavelength converter 25 viewed from the side +Y. FIG. 5 is a cross-sectional view of the wavelength converter 25 taken along a plane along the plane XY.

The wavelength converter 25 according to the present embodiment includes the first phosphor layer (first wavelength conversion layer) 251, a substrate 252, a mirror layer 253, a first optical member 254, a second optical member 257, a third optical member 255, a fourth optical member 256, a second phosphor layer (second wavelength conversion layer) 258, and the light emitting part 260, as shown in FIGS. 3 to 5.

The light emitting part 260 in the present embodiment is an aperture formed by the +Y-side end surfaces of the substrate 252, the first optical member 254, the third optical member 255, and the fourth optical member 256. The fluorescence generated in the first phosphor layer 251 and the second phosphor layer 258 is emitted from the light emitting part 260.

In the wavelength converter 25 according to the present embodiment, the first phosphor layer 251 and the second phosphor layer 258 are housed in a housing space S surrounded by the substrate 252, the first optical member 254, the second optical member 257, the third optical member 255, and the fourth optical member 256. The housing space S is provided, for example, with an air layer AR.

The substrate 252 has a support surface 2521, which supports the first phosphor layer 251. The support surface 2521 is a surface parallel to the plane YZ. The substrate 252 is thermally coupled to the first phosphor layer 251. The substrate 252 is, for example, a plate made of metal that excels in heat dissipation, such as aluminum and copper. The substrate 252, which is thermally coupled to the first phosphor layer 251, dissipates heat of the first phosphor layer 251 to cool the first phosphor layer 251.

The first phosphor layer 251 is supported by the support surface 2521 of the substrate 252.

The first phosphor layer 251 is a plate-shaped phosphor having a front surface (light incident surface) 2511, a side surface 2512, and a rear surface 2513. The front surface 2511 is a surface on which the excitation light EL is incident. The side surface 2512 is a surface that intersects with the front surface 2511. The side surface 2512 may be perpendicular to the front surface 2511. The rear surface 2513 is a surface opposite from the front surface 2511.

The first phosphor layer 251 contains phosphor particles that are excited by the excitation light EL and emits the fluorescence (second light) YL, which is, for example, yellow light having a yellow wavelength band (second wavelength band) ranging from 550 to 640 nm. The phosphor particles can, for example, be yttrium-aluminum-garnet-based (YAG-based) phosphor particles. The phosphor particles may be made of one type of material, or a mixture of particles made of two or more materials may be used as the phosphor particles. The first phosphor layer 251 may, for example, be a phosphor layer in which the phosphor particles are dispersed in an inorganic binder, such as alumina, or a phosphor layer containing sintered phosphor particles with no binder. The first phosphor layer 251 contains a plurality of scatterers K1. The scatterers K1 are pores or light transmissive particles having a refractive index different from that of the phosphor. In the present embodiment, the scatterers K1 are pores.

The mirror layer 253 is provided between the substrate 252 and the first phosphor layer 251. The area of the mirror layer 253 is greater than the area of the rear surface 2513 of the first phosphor layer 251. In the present embodiment, the mirror layer 253 is provided on the support surface 2521 located in the housing space S. That is, the mirror layer 253 is provided around the first phosphor layer 251 at the support surface 2521 of the substrate 252. The first phosphor layer 251 is bonded to the support surface 2521 of the substrate 252 via the mirror layer 253. The mirror layer 253 is formed, for example, of a metal or dielectric layer. The mirror layer 253 may be provided across the entire support surface 2521, that is, so as to cover the region outside the housing space S. A portion of the mirror layer 253 may be formed directly at the rear surface 2513 of the first phosphor layer 251.

The first optical member 254 is disposed so as to face the support surface 2521 of the substrate 252. That is, the first optical member 254 is disposed so as to face the front surface 2511 of the first phosphor layer 251. The first optical member 254 is disposed so as not to be in contact with the first phosphor layer 251.

The first optical member 254 is disposed so as to incline with respect to the front surface 2511 of the first phosphor layer 251. The angle of the first optical member 254 with respect to the front surface 2511 of the first phosphor layer 251 is set at an acute angle.

The first optical member 254 includes a light transmissive substrate 2541, a first optical layer 2542, and a third optical layer 2543. The light transmissive substrate 2541 is formed of a light transmissive member made, for example, of alumina, sapphire, or glass.

The third optical layer 2543 is provided at the outer surface of the light transmissive substrate 2541, that is, at a position shifted from the the first optical layer 2542 toward the light source 22. The third optical layer 2543 is a polarization separation layer having a polarization separation characteristic that causes P-polarized light (light having first wavelength band and polarized in first direction) out of light having the blue wavelength band to pass through the third optical layer 2543 and S-polarized light (light having first wavelength band and polarized in second direction different from first direction) to be reflected off the third optical layer 2543 to separate the light having the blue wavelength band into the P-polarized light and the S-polarized light.

In the present embodiment, the light source 22 is configured to output P-polarized light (light polarized in first direction) with respect to the third optical layer 2543 as the excitation light EL. The excitation light EL outputted from the light source 22 therefore passes through the third optical layer 2543.

The excitation light EL having passed through the third optical layer 2543 is incident on an inner surface of the first optical member 254, that is, enters the first optical layer 2542 provided at the side facing the first phosphor layer 251. The first optical layer 2542 is formed of a dichroic layer characterized so as to transmit the excitation light EL outputted from the light source 22 and incident from the side opposite from the substrate 252 and reflect the fluorescence YL and YL1 (second and third light), which will be described later. The first optical layer 2542 faces the support surface 2521 of the substrate 252. The excitation light EL passes through the first optical member 254 and enters the second phosphor layer 258.

The second phosphor layer 258 is disposed at a position shifted from the first optical member 254 toward the first phosphor layer 251, that is, a position shifted from the first optical layer 2542 toward the first phosphor layer 251. In the present embodiment, the second phosphor layer 258 is provided at the first optical layer 2542.

The second phosphor layer 258 is a plate-shaped phosphor having a front surface (light incident surface) 2581, a side surface 2582, and a rear surface 2583. The rear surface 2583 is a surface which is in contact with the first optical layer 2542 and on which the excitation light EL is incident. The side surface 2582 is a surface that intersects with the front surface 2581. The side surface 2582 may be perpendicular to the front surface 2581. The front surface 2581 is the surface opposite from the rear surface 2583.

In the present embodiment, the second phosphor layer 258 is made of the same phosphor material of which the first phosphor layer 251 is made. The second phosphor layer 258 converts the excitation light EL into fluorescence YL1, which is, for example, yellow light having the yellow wavelength band ranging from 550 to 640 nm, which differs from the blue wavelength band (first wavelength band). In the present embodiment, the yellow wavelength band (third wavelength band) of the fluorescence YL1 emitted by the second phosphor layer 258 is equal to the yellow wavelength band (second wavelength band) of the fluorescence YL emitted by the first phosphor layer 251.

The second phosphor layer 258 contains a plurality of scatterers K2. The scatterers K2 are pores or light transmissive particles having a refractive index different from that of the phosphor. In the present embodiment, the scatterers K2 are pores.

In the present embodiment, the degree of light scattering in the second phosphor layer 258 is smaller than that in the first phosphor layer 251. The degree of light scattering can be adjusted by the number of scatterers contained in the phosphor. In the present embodiment, the number of scatterers K2 contained in the second phosphor layer 258 is smaller than the number of scatterers K1 contained in the first phosphor layer 251. For example, a second phosphor layer 258 having a smaller number of scatterers can be achieved by using a single-crystal phosphor.

The second phosphor layer 258 suppresses backscattering of light as compared with the first phosphor layer 251, so that the excitation light EL incident from the light source 22 is likely to travel and pass through the phosphor without being scattered.

In the present embodiment, a thickness H2 of the second phosphor layer 258 is smaller than a thickness H1 of the first phosphor layer 251. The thickness of the second phosphor layer 258 is the dimension along the direction of a normal to the surface at which the second phosphor layer 258 is provided (surface of first optical layer 2542 of first optical member 254), and the thickness of the first phosphor layer 251 is the dimension along the direction of a normal to the support surface 2521, at which the first phosphor layer 251 is provided. In other words, the thickness H2 of the second phosphor layer 258 is the dimension along the direction of a normal to the surface 2581 (light incident surface) of the second phosphor layer 258, and the thickness H1 of the first phosphor layer 251 is the dimension along the direction of a normal to the front surface 2511 (light incident surface) of the first phosphor layer 251.

The thinner the phosphor, the more readily the excitation light exits from the phosphor before converted into fluorescence.

In the present embodiment, backscattering in the second phosphor layer 258 and the thickness thereof are suppressed as compared with those of the first phosphor layer 251 as described above to suppress the efficiency at which the excitation light EL is converted into fluorescence. Therefore, most of the excitation light EL from the light source 22 passes through and exits out of the second phosphor layer 258 without being converted into fluorescence in the second phosphor layer 258, and enters the first phosphor layer 251 supported by the support surface 2521 of the substrate 252.

The third optical member 255 includes a base 2551 and a fourth optical layer 2552. The material of which the base 2551 is made is, for example, glass. The fourth optical layer 2552 is formed at the inner surface of the base 2551. The fourth optical layer 2552 is formed, for example, of a metal or dielectric layer.

The third optical member 255 is disposed so as to intersect with the support surface 2521 of the substrate 252 and the first optical member 254. The third optical member 255 is so disposed that the fourth optical layer 2552 intersects with the support surface 2521 and the first optical layer 2542. The third optical member 255 may be perpendicular to the support surface 2521 of the substrate 252 and the first optical member 254. The fourth optical layer 2552 may be perpendicular to the support surface 2521 and the first optical layer 2542. The third optical member 255 is so disposed that the thickness direction thereof coincides with the axis-Z direction. The third optical member 255 is disposed in the vicinity of the side, of the first phosphor layer 251 and the second phosphor layer 258, that faces the side +Z. Part of the fluorescence YL and YL1 outputted from the first phosphor layer 251 and the second phosphor layer 258, respectively, toward the side +Z is therefore reflected off the fourth optical layer 2552 of the third optical member 255. The third optical member 255 reflects not only the fluorescence YL and YL1 but the excitation light EL.

The third optical member 255 is a plate having a trapezoidal shape.

The third optical member 255 has a first end surface 55a, which forms the top base of the trapezoidal shape, a second end surface 55b, which forms the bottom base of the trapezoidal shape, a third end surface 55c, which couples the first end surface 55a to the second end surface 55b at the side +X, and a fourth end surface 55d, which couples the first end surface 55a to the second end surface 55b at the side −X, as shown in FIG. 3. The first end surface 55a, the second end surface 55b, the third end surface 55c and the fourth end surface 55d are each a flat surface. The third end surface 55c is a surface facing the substrate 252. The fourth end surface 55d is a surface, of the base 2551, that is opposite from the third end surface 55c. The first optical member 254 is in contact with the fourth end surface 55d. The first optical member 254 is placed on the fourth end surface 55d. The first optical layer 2542 is in contact with the fourth end surface 55d. The light transmissive substrate 2541 is placed on the fourth end surface 55d via the first optical layer 2542.

To use glass as the material of the base 2551, it is necessary to carry out a chamfering process of removing sharp portions to prevent chipping. In the present embodiment, the third optical member 255, which is a plate having a trapezoidal shape, requires no chamfering, whereby the processability of the base 2551 is improved.

In the present embodiment, a portion of the third optical member 255 is buried in the substrate 252. The third optical member 255 is therefore firmly supported by the substrate 252.

A portion of an end portion, of the third optical member 255, that faces the side +X is fitted into a groove 2524 formed at the support surface 2521 of the substrate 252. A gap between the third optical member 255 and the groove 2524 may be filled with an adhesive.

Specifically, the third optical member 255 is so configured that the entire first end surface 55a and third end surface 55c and a portion of the second end surface 55b are fitted into the groove 2524. An end edge 55d1 of the fourth end surface 55d, the end edge located in a position closest to the side –Y and extending along the direction Z, is flush with the support surface 2521 of the substrate 252. The fourth end surface 55d is thus smoothly coupled to the support surface 2521 of the substrate 252. Furthermore, the second end surface 55b is flush with an end surface 52 of the substrate 252 at the side +Y.

The fourth optical member 256 has the same configuration as that of the third optical member 255.

That is, the fourth optical member 256 includes a base 2561 and a fifth optical layer 2562. The fifth optical layer 2562 is formed at the inner surface of the base 2561. The fifth optical layer 2562 is formed, for example, of a metal or dielectric layer.

The fourth optical member 256 is disposed so as to intersect with the support surface 2521 of the substrate 252 and the first optical member 254 and face the third optical member 255. The fourth optical member 256 is so disposed that the fifth optical layer 2562 intersects with the support surface 2521 and the first optical layer 2542 and faces the fourth optical layer 2552. The fourth optical member 256 may be perpendicular to the support surface 2521 of the substrate 252 and the first optical member 254. The fifth optical layer 2562 may be perpendicular to the support surface 2521 and the first optical layer 2542. The fourth optical member 256 is so disposed that the thickness direction thereof coincides with the axis-Z direction. The fourth optical member 256 is disposed in the vicinity of the side, of the first phosphor layer 251 and the second phosphor layer 258, that faces the side –Z. The fluorescence YL and YL1 having been outputted from the first phosphor layer 251 and the second phosphor layer 258, respectively, toward the side –Z and having entered the fourth optical member 256 is therefore reflected off the fifth optical layer 2562 of the fourth optical member 256. The fourth optical member 256 reflects not only the fluorescence YL and YL1 but the excitation light EL.

The fourth optical member 256 is a plate having the same trapezoidal shape as the shape of the third optical member 255.

The fourth optical member 256 has a first end surface 56a, which forms the top base of the trapezoidal shape, a second end surface 56b, which forms the bottom base of the trapezoidal shape, a third end surface 56c, which couples the first end surface 56a to the second end surface 56b at the side +X, and a fourth end surface 56d, which couples the first end surface 56a to the second end surface 56b at the side –X. The first end surface 56a, the second end surface 56b, the third end surface 56c, and the fourth end surface 56d are each a flat surface. The third end surface 56c is a surface facing the substrate 252. The fourth end surface 56d is a surface, of the base 2561, that is opposite from the third end surface 56c. The first optical member 254 is in contact with the fourth end surface 56d. The first optical member 254 is placed on the fourth end surface 56d. The first optical layer 2542 is in contact with the fourth end surface 56d. The light transmissive substrate 2541 is placed on the fourth end surface 56d via the first optical layer 2542.

In the present embodiment, a portion of the fourth optical member 256 is buried in the substrate 252, so that the fourth optical member 256 is firmly supported by the substrate 252.

A portion of an end portion, of the fourth optical member 256, that faces the side +X is fitted into another groove 2524 formed at the support surface 2521 of the substrate 252. A gap between the fourth optical member 256 and the groove 2524 may be filled with an adhesive.

Specifically, the fourth optical member 256 is so configured that the entire first end surface 56a and third end surface 56c and part of the second end surface 56b are fitted into the groove 2524. An end edge 56d1 of the fourth end surface 56d, the end edge located in a position closest to the side –Y and extending along the direction Z, is flush with the support surface 2521 of the substrate 252. The fourth end surface 56d is thus smoothly coupled to the support surface 2521 of the substrate 252. Furthermore, the second end surface 56b is flush with the end surface 52 of the substrate 252 at the side +Y.

In the present embodiment, the first optical member 254 is supported by the third optical member 255 and the fourth optical member 256. The first optical member 254 is bonded and fixed to the third optical member 255 and the fourth optical member 256.

Specifically, the first optical member 254 is provided so as to extend between the fourth end surface 55d of the third optical member 255 and the fourth end surface 56d of the fourth optical member 256. An inner end edge 54a of the first optical member 254 is in contact with the support surface 2521 of the substrate 252 at the side –Y.

Based on the configuration described above, the light emitting part 260 is formed by causing the substrate 252, the first optical member 254, the third optical member 255, and the fourth optical member 256 to close the side –Y of the wavelength converter 25 according to the present embodiment and open at the side +Y of the wavelength converter 25. The wavelength converter 25 therefore prevents leakage of the fluorescence YL in the direction away from the light emitting part 260 and allows efficient output of the light via the light emitting part 260.

In the wavelength converter 25 according to the present embodiment, the second optical member 257 is disposed so as to cover the light emitting part 260, as shown in FIG. 5. The second optical member 257 includes a light transmissive substrate 2571 and a second optical layer 2572. The light transmissive substrate 2571 is formed, for example, of a thin glass plate. The second optical layer 2572 is formed of a dichroic layer that transmits the fluorescence YL (second light) and the fluorescence YL1 (third light) each having the yellow wavelength band (second wavelength band) ranging from 550 to 640 nm and reflects light having the blue wavelength band of the excitation light EL.

The light emitting part 260 can therefore selectively extract yellow light containing the fluorescence YL and YL1 as the illumination light WL via the second optical member 257.

The excitation light EL enters the first phosphor layer 251 in the form of a focused spot on the front surface 2511. The first phosphor layer 251 is excited by the excitation light EL and radiates the fluorescence YL in the form of Lambertian emission.

Part of the fluorescence YL outputted from the first phosphor layer 251 enters the second phosphor layer 258, which is provided at the side, of the first optical member 254 disposed so as to face the front surface 2511 of the first phosphor layer 251, that faces the first phosphor layer 251. At least part of the fluorescence YL having entered the second phosphor layer 258 is backscattered by the plurality of scatterers K2 in the second phosphor layer 258, travels toward the light emitting part 260, passes through the second optical member 257, which covers the light emitting part 260, and exits out thereof.

The part of the fluorescence YL outputted from the first phosphor layer 251 passes through the second phosphor layer 258 and enters the first optical member 254. The fluorescence YL having entered the first optical member 254 is reflected off the first optical layer 2542. At least part of the fluorescence YL reflected off the first optical layer 2542 travels toward the light emitting part 260, passes through the second optical member 257, which covers the light emitting part 260, and exits out thereof.

Part of the fluorescence YL having exited out of the second phosphor layer 258 or the first optical member 254 is incident on the support surface 2521 of the substrate 252, and reflected off the mirror layer 253 formed at the support surface 2521. At least part of the fluorescence YL reflected off the mirror layer 253 travels toward the light emitting part 260, passes through the second optical member 257, which covers the light emitting part 260, and exits out thereof.

The part of the fluorescence YL having exited out of the second phosphor layer 258 or the first optical member 254 enters the third optical member 255 or the fourth optical member 256 via the mirror layer 253 or directly enters the third optical member 255 or the fourth optical member 256. The part of the fluorescence YL is reflected off the third optical member 255 or the fourth optical member 256, travels toward the light emitting part 260, passes through the second optical member 257, which covers the light emitting part 260, and exits out thereof.

The part of the fluorescence YL having exited out of the second phosphor layer 258 or the first optical member 254 propagates in the direction away from the light emitting part 260 (toward side −Y), and eventually travels toward the light emitting part 260 after undergoing repeated reflection, passes through the second optical member 257, which covers the light emitting part 260, and exits out thereof. The wavelength converter 25 according to the present embodiment thus allows the fluorescence YL generated in the first phosphor layer 251 to exit out of the light emitting part 260.

In the present embodiment, part of the excitation light EL is backscattered in the first phosphor layer 251. Another part of the excitation light EL is reflected off the surface of the first phosphor layer 251. The excitation light that is backscattered in or reflected off the first phosphor layer 251 and exits out of the first phosphor layer 251 as described above is called excitation light EL1.

At least part of the excitation light EL1 enters the second phosphor layer 258 disposed so as to face the front surface 2511 of the first phosphor layer 251. Most of the excitation light EL1 is the component backscattered in the first phosphor layer 251. The backscattered light exits in a variety of directions, and therefore efficiently enters the second phosphor layer 258. At least part of the excitation light EL1 having entered the second phosphor layer 258 is efficiently converted into the fluorescence YL1, which is radiated via the rear surface 2583 of the second phosphor layer 258 in the form of Lambertian emission.

Since the second phosphor layer 258 is thinner than the first phosphor layer 251, part of the excitation light EL1 passes through the second phosphor layer 258 and reaches the third optical layer 2543 in some cases. The component backscattered in the first phosphor layer 251 out of the excitation light EL1 forms unpolarized light that is a mixture of S-Polarized light and P-Polarized light. The excitation light EL1 is therefore separated in the third optical layer 2543 into the P-polarized component and the S-polarized component. Specifically, out of the excitation light EL1 having entered the third optical layer 2543, an S-polarized component EL1s is reflected off the third optical layer 2543, and a P-polarized component EL1p passes through the third optical layer 2543 and exits out of the first optical member 254. Note that the P-polarized component EL1p, which exits out of the wavelength converter 25, is a very small fraction of the excitation light EL outputted from the light source 22 and therefore causes no problem in practice.

The S-polarized component EL1s reflected off the third optical layer 2543 enters the second phosphor layer 258 again. At least part of the S-polarized component EL1s is thus reflected off the third optical layer 2543, enters the second phosphor layer 258, and is reused to generate the fluorescence YL1. Another part of the S-polarized component EL1s enters the first phosphor layer 251 via the second phosphor layer 258, and is reused to generate the fluorescence YL.

At least part of the fluorescence YL1 outputted from the second phosphor layer 258 travels toward the light emitting part 260, passes through the second optical member 257, which covers the light emitting part 260, and exits out thereof, as described above.

Another part of the fluorescence YL1 outputted from the second phosphor layer 258 is incident on the support surface 2521 of the substrate 252, and reflected off the mirror layer 253 formed at the support surface 2521. The fluorescence YL1 reflected off the mirror layer 253 travels toward the light emitting part 260, passes through the second optical member 257, which covers the light emitting part 260, and exits out thereof.

Still another part of the fluorescence YL1 outputted from the second phosphor layer 258 enters the third optical member 255 or the fourth optical member 256 via the mirror layer 253 or directly enters the third optical member 255 or the fourth optical member 256. The part of the fluorescence YL1 is reflected off the third optical member 255 or the fourth optical member 256, travels toward the light emitting part 260, passes through the second optical member 257, which covers the light emitting part 260, and exits out thereof.

Still further another part of the fluorescence YL1 outputted from the second phosphor layer 258 propagates in the direction away from the light emitting part 260 (toward side −Y), and eventually travels toward the light emitting part 260 after undergoing repeated reflection, passes through the second optical member 257, which covers the light emitting part 260, and exits out thereof. The wavelength converter 25 according to the present embodiment thus allows the fluorescence YL1 generated in the second phosphor layer 258 to exit out of the light emitting part 260.

In the wavelength converter 25 according to the present embodiment, the −Y side of the first phosphor layer 251, which is the side opposite from the light emitting part 260, tends to confine more heat and become hotter than the side facing the light emitting part 260, which outputs the fluorescence YL. In contrast, in the wavelength converter 25 according to the present embodiment, the substrate 252, which supports the first phosphor layer 251, has a shape elongated in the direction away from the light emitting part 260, as shown in FIGS. 3 and 5. The wavelength converter 25 according to the present embodiment therefore allows efficient cooling of the side, of the first phosphor layer 251, that is opposite from the light emitting part 260 and tends to confine the heat. The first phosphor layer 251 can therefore be efficiently cooled.

In the wavelength converter 25 according to the present embodiment, the heat of the second phosphor layer 258 is dissipated via the first optical member 254, whereby the second phosphor layer 258 can be efficiently cooled. The fluorescence conversion efficiency of the second phosphor layer 258 can thus be increased.

The fluorescence YL and YL1 outputted from the wavelength converter 25 enters the pickup system 26. The pickup system 26 is formed, for example, of pickup lenses 26a and 26b. The pickup system 26 has the function of picking up and parallelizing the fluorescence YL and YL1 outputted from the wavelength converter 25. The fluorescence YL and YL1 parallelized by the pickup system 26 is hereinafter referred to as the illumination light WL.

The illumination light WL enters the optical integration system 35. The optical integration system 35 is formed, for example, of a first lens array 35a and a second lens array 35b.

The first lens array 35a includes a plurality of first lenslets 35am, and the second lens array 35b includes a plurality of second lenslets 35bm.

The first lens array 35a separates the illumination light WL into a bundle of a plurality of thin beams. The first lenslets 35am bring the bundle of a plurality of thin beams into focus at the corresponding second lenslets 35bm. The optical integration system 35 cooperates with the superimposing lens 37, which will be described later, to homogenize the illuminance distribution in the image formation regions of the light modulators 4R and 4G shown in FIG. 1, which are illumination receiving regions.

The illumination light WL having passed through the optical integration system 35 enters the polarization converter 36. The polarization converter 36 is formed, for example, of polarization separation films and retardation films (half-wave plates). The polarization converter 36 converts the polarization directions of the fluorescence YL into one of the polarized components.

The illumination light WL having passed through the polarization converter 36 enters the superimposing lens 37. The illumination light WL having exited out of the superimposing lens 37 enters the color separation system 3. The superimposing lens 37 superimposes the bundle of a plurality of thin beams described above, which form the illumination light WL, on one another in the illumination receiving regions, that is, the image formation regions of the light modulators 4R and 4G so that the regions are uniformly illuminated.

The wavelength converter 25 according to the present embodiment described above provides the following effects.

The wavelength converter 25 according to the present embodiment includes the substrate 252 having the support surface 2521, the first optical member 254, which includes the first optical layer 2542, which faces the support surface 2521 and transmits the excitation light EL incident from the side opposite from the substrate 252, the first phosphor layer 251, which is disposed at the support surface 2521, has the front surface 2511, on which the excitation light EL having exited out of the first optical layer 2542 is incident, and converts the excitation light EL into the fluorescence YL having the yellow wavelength band, the second phosphor layer 258, which is disposed in a position shifted from the first optical layer 2542 toward the first phosphor layer 251 and converts the excitation light EL into the fluorescence YL1 having the yellow wavelength band, the light emitting part 260, which is formed by at least the substrate 252 and the first optical member 254 and outputs light, and the second optical member 257, which includes the second optical layer 2572, which reflects the excitation light EL and transmits the fluorescence YL and YL1, and is disposed in the light emitting part 260. The first optical layer 2542 inclines with respect to the front surface 2511 and reflects the fluorescence YL and YL1, and the second phosphor layer 258 converts part of the excitation light EL having exited out of the first phosphor layer 251 into the fluorescence YL1.

The wavelength converter 25 according to the present embodiment can use the excitation light EL having passed through the second phosphor layer 258 to generate the fluorescence YL in the first phosphor layer 251, and use the excitation light EL1 having exited out of the first phosphor layer 251 through backscattering and other phenomena to generate the fluorescence YL1 in the second phosphor layer 258.

The excitation light EL outputted from the light source 22 can thus be efficiently utilized to generate the fluorescence YL and YL1, whereby the fluorescence YL and YL1 can be efficiently extracted via the light emitting part 260.

The wavelength converter 25 according to the present embodiment, which can increase the efficiency at which the fluorescence YL and YL1 is extracted, can therefore generate bright illumination light WL.

In the wavelength converter 25 according to the present embodiment, the area of light emitting part 260 can be regarded as an apparent fluorescence emission area, whereby the etendue of the illumination light WL can be reduced. The wavelength converter 25 according to the present embodiment, which allows reduction in the etendue without reduction in the area, of the first phosphor layer 251 or the second phosphor layer 258, on which the excitation light EL is incident, can suppress a decrease in the fluorescence conversion efficiency due to an increase in the optical density of the excitation light EL on the first phosphor layer 251 or the second phosphor layer 258.

The wavelength converter 25 according to the present embodiment allows generation of the illumination light WL formed of the bright fluorescence YL and YL1 having reduced etendue with an increase in the optical density of the excitation light EL suppressed.

In the wavelength converter 25 according to the present embodiment, the fluorescence YL1 outputted from the second phosphor layer 258 has the same yellow wavelength band of the fluorescence YL outputted from the first phosphor layer 251. The excitation light EL is blue light.

According to the configuration described above, the first phosphor layer 251 and the second phosphor layer 258 can generate the fluorescence YL and YL1 having the yellow wavelength band. Bright yellow light can thus be generated as the illumination light WL.

In the wavelength converter 25 according to the present embodiment, the thickness H2 of the second phosphor layer 258 is smaller than the thickness H1 of the first phosphor layer 251.

According to the configuration described above, the excitation light EL can pass through the second phosphor layer 258 and efficiently enter the first phosphor layer 251 as compared with a case where the first phosphor layer 251 and the second phosphor layer 258 have the same thickness.

In the wavelength converter 25 according to the present embodiment, the degree of light scattering in the second phosphor layer 258 is smaller than that in the first phosphor layer 251.

According to the configuration described above, in which the backscattering of light in the second phosphor layer 258 is suppressed as compared with the degree of the suppression in the first phosphor layer 251, the excitation light EL can pass through the second phosphor layer 258 and efficiently enter the first phosphor layer 251 as compared with a case where the first phosphor layer 251 and the second phosphor layer 258 provide the same degree of scattering of light.

In the wavelength converter 25 according to the present embodiment, the excitation light EL incident on the first optical member 254 from the side opposite from the substrate 252 is P-polarized light, and the first optical member 254 further includes the third optical layer 2543, which is disposed at a position shifted from the first optical layer 2542 in the direction away from the substrate 252, transmits the p-polarized excitation light EL, and reflects the s-polarized excitation light EL.

According to the configuration described above, the excitation light EL from the light source 22 can be efficiently introduced into the first optical member 254. In addition, the first optical layer 2542 reflects the S-polarized component EL1s of the excitation light EL1 having exited out of the first phosphor layer 251 and passed through the first optical layer 2542 back into the first phosphor layer 251 to allow the S-polarized component EL1s to be used to excite the first phosphor layer 251 or the second phosphor layer 258 again. The efficiency at which the excitation light EL outputted from the light source 22 is used can therefore be improved.

The wavelength converter 25 according to the present embodiment further includes the third optical member 255, which includes the fourth optical layer 2552, which reflects the excitation light EL and the fluorescence YL and YL1, and in which the fourth optical layer 2552 is disposed so as to intersect with the support surface 2521 and the first optical layer 2542, and the fourth optical member 256, which includes the fifth optical layer 2562, which reflects the excitation light EL and the fluorescence YL and YL1, and in which the fifth optical layer 2562 intersects with the support surface 2521 and the first optical layer 2542 and faces the fourth optical layer 2552. The light emitting part 260 is formed by the substrate 252, the first optical member 254, the third optical member 255, and the fourth optical member 256.

The configuration described above, in which light leakage from portions excluding the light emitting part 260 is suppressed, allows the illumination light WL to be efficiently outputted via the light emitting part 260.

The first light source apparatus 20 according to the present embodiment includes the light source 22, which outputs the excitation light source EL, and the wavelength converter 25.

The first light source apparatus 20 according to the present embodiment, which efficiently extracts the fluorescence, can output bright illuminator light WL.

The projector 1 according to the present embodiment described above provides the following effects.

The projector 1 according to the present embodiment includes the first light source apparatus 20, the second light source apparatus 21, the light modulators 4B, 4G, and 4R, which modulate the blue light LB, the green light LG, and the red light LR from the first light source apparatus 20 and the second light source apparatus 21 in accordance with image information to form image light, and the projection optical apparatus 6, which projects the image light described above.

The projector 1 according to the present embodiment, which includes the first light source apparatus 20, which generates the bright illumination light WL, can form and project a high-luminance image.

Second Embodiment

Another configuration of the light source apparatus will be subsequently described as a second embodiment of the present disclosure. The present embodiment and the first embodiment differ in the structure of the wavelength converter from each other, and the structure of the wavelength converter will therefore be primarily described below. In the present embodiment, configurations or members common to those in the first embodiment have the same reference characters and will not be described in detail.

Figure 6:
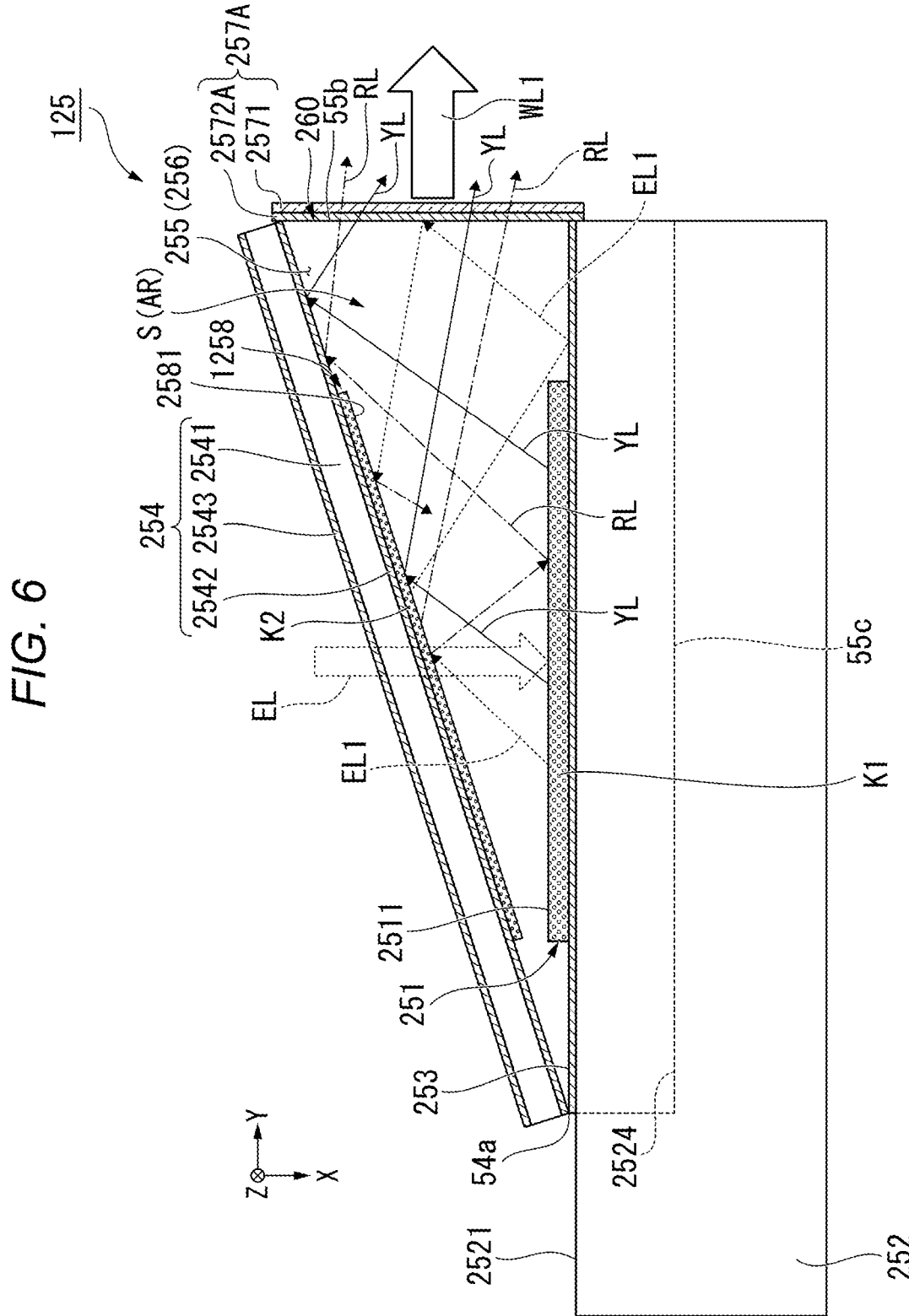
FIG. 6 is a cross-sectional view of a wavelength converter according to a second embodiment.

FIG. 6 is a cross-sectional view of the wavelength converter according to the present embodiment taken along a plane along the plane XY. FIG. 6 corresponds to FIG. 5 in the first embodiment.

A wavelength converter 125 according to the present embodiment includes the first phosphor layer 251, the substrate 252, the mirror layer 253, the first optical member 254, a second optical member 257A, the third optical member 255, the fourth optical member 256, and a second phosphor layer 1258, as shown in FIG. 6.

In the present embodiment, the second phosphor layer 1258 is made of a phosphor material different from that of the first phosphor layer 251. The second phosphor layer 1258 converts the excitation light EL into fluorescence RL, which is, for example, red light having a red wavelength band ranging from 600 to 800 nm, which differs from the blue wavelength band. In the present embodiment, the wavelengths in the red wavelength band (third wavelength band) of the fluorescence RL emitted by the second phosphor layer 1258 are longer than those in the yellow wavelength band (second wavelength band) of the fluorescence YL emitted by the first phosphor layer 251 and those in the blue wavelength band (first wavelength band) of the excitation light EL outputted by the light source 22.

The phosphor that emits the red light described above is, for example, a YAG-based phosphor made of $(Y_{1-x},Gd_x)_3$ $(Al,Ga)_5O_{12}$ with any of Pr, Eu, and Cr dispersed as an activator (any of Pr:YAG, Eu:YAG, and Cr:YAG). The activator may contain one element selected from Pr, Eu, and Cr or may be a co-activated activator containing a plurality of elements selected from Pr, Eu, and Cr.

In the present embodiment, the degree of light scattering in the second phosphor layer 1258 is smaller than that in the first phosphor layer 251. In the present embodiment, the number of scatterers K2 contained in the second phosphor layer 1258 is smaller than the number of scatterers K1 contained in the first phosphor layer 251.

Also in the present embodiment, in which the second phosphor layer 1258 is thinner than the first phosphor layer 251, the second phosphor layer 1258 is likely to transmit the excitation light EL outputted from the light source 22.

In the wavelength converter 125 according to the present embodiment, a second optical layer 2572A of the second optical member 257A is formed, for example, of a dichroic layer that transmits the fluorescence YL (second light) having the yellow wavelength band (second wavelength band) ranging from 550 to 640 nm and the fluorescence RL having the red wavelength band (third wavelength band) ranging from 600 to 800 nm and reflects light having the blue wavelength band including the excitation light EL. That is, the second optical layer 2572A in the present embodiment is formed of a dichroic layer that transmits a wider band (band including yellow and red wavelength bands) than the wavelength band that the second optical layer 2572 in the first embodiment transmits.

The second optical member 257A (second optical layer 2572A), which is disposed in the light emitting part 260, does not block the fluorescence YL or RL to be outputted via the light emitting part 260.

The first light source apparatus 20 according to the present embodiment described above can use the excitation light EL having passed through the second phosphor layer 1258 to generate the fluorescence YL, which is yellow light, in the first phosphor layer 251, and use the excitation light EL1 having exited out of the first phosphor layer 251 through backscattering and other phenomena to generate the fluorescence RL, which is red light, in the second phosphor layer 1258.

The first light source apparatus 20 according to the present embodiment can thus efficiently utilize the excitation light EL outputted from the light source 22 to generate the fluorescence YL and RL, whereby the fluorescence YL and RL can be efficiently extracted via the light emitting part 260.

The first light source apparatus 20 according to the present embodiment, which can increase the efficiency at which the fluorescence YL and RL is extracted, can therefore generate bright illumination light WL1.

Consider, for example, that to generate white illumination light having a color temperature of 6500K, the yellow fluorescence alone causes an insufficient amount of red component. In contrast, in the first light source apparatus 20 according to the present embodiment, the fluorescence RL, which is red light generated in the second phosphor layer 1258, can compensate the red component of the illumination light WL1. The first light source apparatus 20 according to the present embodiment can therefore generate the white illumination light WL1 containing a sufficient amount of red component and allowing high color reproducibility.

The present disclosure has been described with reference to the embodiments by way of example but is not necessarily limited to the embodiments described above, and a variety of changes can be made thereto to the extent that the changes do not depart from the intent of the present disclosure.

For example, the aforementioned embodiments have been described with reference to the case where the reduced amount of scatters in the second phosphor layers 258 and 1258 and the reduced thickness thereof as compared with those of the first phosphor layer 251 allow the excitation light EL to readily pass through the second phosphor layers 258 and 1258 with the reduced amount of fluorescence converted therein. Instead, only one of the amount of scatterers in the second phosphor layers 258 and 1258 or the thickness thereof may be adjusted to control the amount of converted fluorescence.

The aforementioned embodiments have been described with reference to the case where the light emitting part 260 is formed by the substrate 252, the first optical member 254, the third optical member 255, and the fourth optical member 256. Instead, at least the substrate 252 and the first optical member 254 may form the light emitting part.

The aforementioned embodiments have been described with reference to the case where the first optical member 254, the third optical member 255, and the fourth optical member 256 are formed of separate members. Instead, the first optical member 254, the third optical member 255, and the fourth optical member 256 may be integrated into a single member.

The aforementioned embodiments have been described with reference to the case where the second phosphor layers 258 and 1258 are each formed of a single plate-shaped phosphor. Instead, the second phosphor layers 258 and 1258 may each be formed of a plurality of discretely arranged phosphors. When the second phosphor layers 258 and 1258 are each formed of a plurality of phosphors, the second phosphor layer may contain both a phosphor that emits yellow light and a phosphor that emits red light.

For example, the aforementioned embodiments have been described with reference to the case where the width, of the first phosphor layer 251, in the direction Z, is smaller than the width, of the support surface 2521 located in the housing space S, in the direction Z. Instead, the width, of the rear surface 2513 of the first phosphor layer 251, in the direction Z may be equal to the width, of the support surface 2521 located in the housing space S, in the direction Z. In this case, the side surface 2512 of the first phosphor layer 251 is in contact with the third optical member 255 and the fourth optical member 256, so that the fluorescence YL having exited via the side surface 2512 is reflected off the third optical member 255 and the fourth optical member 256 back into the first phosphor layer 251.

Similarly, the aforementioned embodiments have been described with reference to the case where the width, of the second phosphor layer 258, in the direction Z, is smaller than the width, of the first optical member 254 located in the housing space S, in the direction Z. Instead, the width, of the second phosphor layer 258, in the direction Z may be equal to the width, of the first optical member 254, in the direction Z.

In the embodiments described above, the projector 1 including the three light modulators 4R, 4G, and 4B has been presented by way of example. Instead, the present disclosure is also applicable to a projector that displays color video images via one light modulator. Furthermore, the light modulators are not limited to the liquid crystal panels described above and can instead, for example, be digital mirror devices.

In the embodiments described above, the light source apparatus according to the present disclosure is used in a projector by way of example, but not necessarily. The light source apparatus according to the present disclosure may be used as a lighting apparatus, such as a headlight of an automobile.

A wavelength converter according to an aspect of the present disclosure may have the configuration below.

The wavelength converter according to the aspect of the present disclosure includes a substrate having a support surface, a first optical member including a first optical layer that faces the support surface and transmits first light having a first wavelength band and incident from the side opposite from the substrate, a first wavelength conversion layer that is disposed at the support surface, has a light incident surface on which the first light having exited out of the first optical layer is incident, and converts the first light into second light having a second wavelength band different from the first wavelength band, a second wavelength conversion layer that is disposed at a position shifted from the first optical layer toward the first wavelength conversion layer, and converts the first light into third light having a third wavelength band different from the first wavelength band, a light emitting part that is formed by at least the substrate and the first optical member and outputs light, and a second optical member that includes a second optical layer that reflects the first light and transmits the second and third light and is disposed in the light emitting part. The first optical layer inclines with respect to the light incident surface and reflects the second and third light. The second wavelength conversion layer converts part of the first light outputted from the first wavelength conversion layer into the third light.

In the wavelength converter according to the aspect of the present disclosure, the third wavelength band may be the second wavelength band.

In the wavelength converter according to the aspect of the present disclosure, the first light may be blue light, and the second and third light may be yellow light.

In the wavelength converter according to the aspect of the present disclosure, the wavelengths in the third wavelength band may be longer than those in the first and second wavelength bands.

In the wavelength converter according to the aspect of the present disclosure, the first light may be blue light, the second light may be yellow light, and the third light may be red light.

In the wavelength converter according to the aspect of the present disclosure, the second wavelength conversion layer may be thinner than the first wavelength conversion layer.

In the wavelength converter according to the aspect of the present disclosure, the degree of scattering of light in the second wavelength conversion layer may be smaller than the degree of scattering of light in the first wavelength conversion layer.

In the wavelength converter according to the aspect of the present disclosure, the first light incident on the first optical member from the side opposite from the substrate may be polarized in a first direction, and the first optical member may further include a third optical layer that is disposed in a position shifted from the first optical layer in the direction away from the substrate, transmits the first light polarized in the first direction, and reflects the first light polarized in a second direction different from the first direction.

The wavelength converter according to the aspect of the present disclosure may further include a third optical member which includes a fourth optical layer that reflects the first, second, and third light and in which the fourth optical layer is disposed so as to intersect with the support surface and the first optical layer, and a fourth optical member which includes a fifth optical layer that reflects the first, second, and third light and in which the fifth optical layer is disposed so as to intersect with the support surface and the first optical layer and face the fourth optical layer, and the light emitting part may be formed by the substrate, the first optical member, the third optical member, and the fourth optical member.

A light source apparatus according to another aspect of the present disclosure may have the configuration below.

The light source apparatus according to the other aspect of the present disclosure includes a light source that outputs the first light and the wavelength converter according to the aspect of the present disclosure.

A projector according to a still another aspect of the present disclosure may have the configuration below.

The projector according to the still other aspect of the present disclosure includes the light source apparatus according to the other aspect of the present disclosure, a light modulator that modulates light from the light source apparatus in accordance with image information, and a projection optical apparatus that projects the light modulated by the light modulator.

What is claimed is:

1. A wavelength converter comprising:
a substrate having a support surface;
a first optical member including a first optical layer that faces the support surface and transmits first light having a first wavelength band and incident from a side opposite from the substrate;
a first wavelength conversion layer disposed at the support surface and including a light incident surface on which the first light emitted from the first optical layer is incident, the first wavelength conversion layer being configured to convert the first light into second light having a second wavelength band different from the first wavelength band;
a second wavelength conversion layer disposed at a first wavelength conversion layer side with respect to the first optical layer and configured to convert the first light into third light having a third wavelength band different from the first wavelength band;
a light emitting part formed by at least the substrate and the first optical member and configured to emit light; and
a second optical member disposed at the light emitting part and including a second optical layer that reflects the first light and transmits the second and third lights,
wherein the first optical layer inclines with respect to the light incident surface and reflects the second and third lights,
the second wavelength conversion layer converts part of the first light emitted from the first wavelength conversion layer into the third light,
the first light incident on the first optical member from the side opposite from the substrate is polarized in a first direction, and
the first optical member further includes a third optical layer disposed at the side opposite from the substrate with respect to the first optical layer, the third optical layer being configured to transmit the first light polarized in the first direction and reflect the first light polarized in a second direction different from the first direction.

2. The wavelength converter according to claim 1, wherein the third wavelength band is the second wavelength band.

3. The wavelength converter according to claim 2, wherein the first light is blue light, and the second light and the third light are each yellow light.

4. The wavelength converter according to claim 1, wherein wavelengths in the third wavelength band are longer than wavelengths in the first and second wavelength bands.

5. The wavelength converter according to claim 4, wherein the first light is blue light, the second light is yellow light, and the third light is red light.

6. The wavelength converter according to claim 1, wherein the second wavelength conversion layer is thinner than the first wavelength conversion layer.

7. The wavelength converter according to claim 1, wherein a degree of scattering of light in the second wavelength conversion layer is smaller than a degree of scattering of light in the first wavelength conversion layer.

8. The wavelength converter according to claim 1, further comprising:
a third optical member including a fourth optical layer that reflects the first, second, and third lights and intersects the support surface and the first optical layer; and
a fourth optical member including a fifth optical layer that reflects the first, second, and third light, the fifth optical layer intersecting the support surface and the first optical layer and facing the fourth optical layer,
wherein the light emitting part is formed by the substrate, the first optical member, the third optical member, and the fourth optical member.

9. A light source apparatus comprising:
a light source that outputs the first light; and
the wavelength converter according to claim 1.

10. A projector comprising:

the light source apparatus according to claim 9;

a light modulator that modulates light emitted from the light source apparatus; and a projection optical apparatus that projects the light modulated by the light modulator.

11. A wavelength converter comprising:

a substrate having a support surface;

a first optical member including a first optical layer that faces the support surface and transmits first light having a first wavelength band and incident from a side opposite from the substrate;

a first wavelength conversion layer disposed at the support surface and including a light incident surface on which the first light emitted from the first optical layer is incident, the first wavelength conversion layer being configured to convert the first light into second light having a second wavelength band different from the first wavelength band;

a second wavelength conversion layer disposed at a first wavelength conversion layer side with respect to the first optical layer and configured to convert the first light into third light having a third wavelength band different from the first wavelength band;

a light emitting part formed by at least the substrate and the first optical member and configured to emit light;

a second optical member disposed at the light emitting part and including a second optical layer that reflects the first light and transmits the second and third lights;

a third optical member including a fourth optical layer that reflects the first, second, and third lights and intersects the support surface and the first optical layer; and a fourth optical member including a fifth optical layer that reflects the first, second, and third light, the fifth optical layer intersecting the support surface and the first optical layer and facing the fourth optical layer, wherein the first optical layer inclines with respect to the light incident surface and reflects the second and third lights, the second wavelength conversion layer converts part of the first light emitted from the first wavelength conversion layer into the third light, and the light emitting part is formed by the substrate, the first optical member, the third optical member, and the fourth optical member.

12. The wavelength converter according to claim 11, wherein the third wavelength band is the second wavelength band.

13. The wavelength converter according to claim 12, wherein the first light is blue light, and the second light and the third light are each yellow light.

14. The wavelength converter according to claim 11, wherein wavelengths in the third wavelength band are longer than wavelengths in the first and second wavelength bands.

15. The wavelength converter according to claim 14, wherein the first light is blue light, the second light is yellow light, and the third light is red light.

16. The wavelength converter according to claim 11, wherein the second wavelength conversion layer is thinner than the first wavelength conversion layer.

17. The wavelength converter according to claim 11, wherein a degree of scattering of light in the second wavelength conversion layer is smaller than a degree of scattering of light in the first wavelength conversion layer.

18. The wavelength converter according to claim 11, wherein the first light incident on the first optical member from the side opposite from the substrate is polarized in a first direction, and the first optical member further includes a third optical layer disposed at the side opposite from the substrate with respect to the first optical layer, the third optical layer being configured to transmit the first light polarized in the first direction and reflect the first light polarized in a second direction different from the first direction.

19. A light source apparatus comprising:

a light source that outputs the first light; and the wavelength converter according to claim 11.

20. A projector comprising:

the light source apparatus according to claim 19;

a light modulator that modulates light emitted from the light source apparatus; and a projection optical apparatus that projects the light modulated by the light modulator.

* * * * *